US010698385B2

(12) United States Patent
Okamoto et al.

(10) Patent No.: US 10,698,385 B2
(45) Date of Patent: Jun. 30, 2020

(54) MACHINE APPARATUS AND METHOD OF CONTROLLING THE SAME, REMOTE OPERATION APPARATUS, AND MAIN OPERATION APPARATUS

(71) Applicant: DMG Mori Co. Ltd., Nara (JP)

(72) Inventors: Yoichi Okamoto, Nara (JP); Eiichiro Gomi, Nara (JP)

(73) Assignee: DMG Mori Co. Ltd., Nara (JP)

( * ) Notice: Subject to any disclaimer, the term of this patent is extended or adjusted under 35 U.S.C. 154(b) by 242 days.

(21) Appl. No.: 15/324,630

(22) PCT Filed: Jun. 22, 2015

(86) PCT No.: PCT/JP2015/067860
§ 371 (c)(1),
(2) Date: Jan. 6, 2017

(87) PCT Pub. No.: WO2016/006423
PCT Pub. Date: Jan. 14, 2016

(65) Prior Publication Data
US 2017/0205803 A1     Jul. 20, 2017

(30) Foreign Application Priority Data
Jul. 10, 2014 (JP) ................................. 2014-142767

(51) Int. Cl.
*G05B 19/4061* (2006.01)
*G08C 17/00* (2006.01)
(Continued)

(52) U.S. Cl.
CPC ....... *G05B 19/4061* (2013.01); *B23Q 1/0045* (2013.01); *F16P 3/12* (2013.01);
(Continued)

(58) Field of Classification Search
CPC .................................................. G05B 19/4061
See application file for complete search history.

(56) References Cited

U.S. PATENT DOCUMENTS 7,236,161 B2    6/2007   Geaghan et al.
7,623,934 B2   11/2009   Iefuji et al.
(Continued)

FOREIGN PATENT DOCUMENTS

CN        1761932 A      4/2006
CN      101026890 A      8/2007
(Continued)

OTHER PUBLICATIONS

English translation of International Search Report for PCT/JP2015/067860 dated Sep. 8, 2015, 4 pages.
(Continued)

*Primary Examiner* — Tejal Gami
(74) *Attorney, Agent, or Firm* — Fish & Richardson P.C.

(57) ABSTRACT

A machine apparatus that a user can more easily operate includes a machine driver that is mechanically driven, a main operation unit that operates the machine driver, a remote operation unit that transmits an operation instruction signal to the machine driver at a position apart from the main operation unit, a position determiner that determines a position of the remote operation unit, and a controller that, upon determining that the remote operation unit is located in a predetermined area, enables operations by the main operation unit, and upon determining that the remote operation unit is located outside the predetermined area, disables at least some operations by the main operation unit.

18 Claims, 6 Drawing Sheets

(51) Int. Cl.
*B23Q 1/00* (2006.01)
*F16P 3/12* (2006.01)
*G08C 23/02* (2006.01)

(52) U.S. Cl.
CPC ............ *G08C 17/00* (2013.01); *G08C 23/02* (2013.01); *G05B 2219/24148* (2013.01); *G05B 2219/40543* (2013.01); *G08C 2201/91* (2013.01)

(56) References Cited

U.S. PATENT DOCUMENTS

| | | | |
|---|---|---|---|
| 9,187,105 B2 | 11/2015 | Tamaribuchi et al. | |
| 9,475,200 B2 | 10/2016 | Schlaich et al. | |
| 2006/0111025 A1* | 5/2006 | Yanaka | B24C 1/08 451/75 |
| 2007/0202864 A1 | 8/2007 | Sasao | |
| 2008/0195244 A1 | 8/2008 | Jou et al. | |
| 2008/0234855 A1 | 9/2008 | Haas et al. | |
| 2012/0062947 A1 | 3/2012 | Shozaki | |
| 2014/0033130 A1* | 1/2014 | Paccagnan | G05B 19/409 715/835 |

FOREIGN PATENT DOCUMENTS

| | | |
|---|---|---|
| CN | 102135767 A | 7/2011 |
| CN | 102582666 A | 7/2012 |
| CN | 102905021 A | 1/2013 |
| CN | 103020531 A | 4/2013 |
| CN | 103260834 A | 8/2013 |
| CN | 103809856 A | 5/2014 |
| JP | 5-324037 | 12/1993 |
| JP | 11-305815 | 11/1999 |
| JP | 2002-355244 | 12/2002 |
| JP | 2006-218548 | 8/2006 |
| JP | 2007-160449 | 6/2007 |
| JP | 2009-193568 | 8/2009 |
| JP | 2012-61669 | 3/2012 |
| KR | 2003-0082797 A | 10/2003 |
| WO | WO 2014/057854 | 4/2014 |

OTHER PUBLICATIONS

English translation of the First Notification of Office Action issued in CN Appl. No. 201580037414.4 dated Sep. 4, 2018, 12 pages.

Qian, et al., "Web-based Remote Control System for CNC Machine Tool,", Design and Research, No. 11 Nov. 2002 , Total Issue No .484, English Abstract, 3 pages.

Zhihang et al., "Study and Design of a Remote Fault Diagnostic System Based on Internet," Machine Tool & Hydraulics, English Abstract, Feb. 2009, vol. 37(2):196-198.

English translation of the 2$^{nd}$ Notification of an Office Action; Chinese Office Action issued in CN Appl. No. 201580037414.4 dated Mar. 14, 2019, 23 pages.

* cited by examiner

MACHINE APPARATUS AND METHOD OF CONTROLLING THE SAME, REMOTE OPERATION APPARATUS, AND MAIN OPERATION APPARATUS

CROSS-REFERENCE TO RELATED APPLICATIONS

The present application is the national stage entry of International Patent Application No. PCT/JP2015/067860, filed on Jun. 22, 2015, and claims priority to Application No. JP 2014-142767, filed on Jul. 10, 2014, the disclosures of which are incorporated herein in its entirety by reference thereto.

TECHNICAL FIELD

The present invention relates to a machine apparatus and a method of controlling the same, a remote operation apparatus, and a main operation apparatus.

BACKGROUND ART

In the above technical field, patent literature 1 discloses a cancel button configured to cancel lock by a manual pulse generator.

Patent literature 2 discloses an enable and deadman switch in a handy pendant. This switch is a switch having both the function of an enable switch that selects an operation state or a non-operation state of a handy pendant and the function of a deadman switch that immediately stops the movement of a movable body of a machine tool in case of emergency without considering the relationship with set axial data. That is, the enable and deadman switch has stop positions of two steps. For example, when the enable and deadman switch is lightly pressed, the operation state of the handy pendant is formed. In this state, selection of a drive axis, setting of a drive pulse generation rate, and an operation of each drive axis, and the like can be done. On the other hand, when the enable and deadman switch is, for example, strongly pressed up to the secondary stop position, a non-operation state is attained, in which the movement of a movable body of a machine tool immediately stops without considering the relationship with coordinate data. Note that the non-operation state is also attained in a case in which the operator does not touch the enable and deadman switch at all. Hence, selection of a drive axis, switching of a drive pulse rate, and the like can be performed only in the operation state obtained by lightly pressing the enable and deadman switch up to the primary stop position.

In addition, patent literature 3 discloses an NC apparatus including a main operation unit with a screen, and a sub operation unit that displays at least part of the displayed screen and is communicable with the main operation unit and mechanically detachable from the main operation unit.

CITATION LIST

Patent Literature

Patent literature 1: Japanese Patent No. 4535998
Patent literature 2: Japanese Patent Laid-Open No. 11-305815
Patent literature 3: Japanese Patent Laid-Open No. 5-324037

SUMMARY OF THE INVENTION

Technical Problem

In the technique described in literature 1, however, it is necessary to change the operation mode such as an automatic operation based on an NC program, a first manual operation based on data input from an operation key or a keyboard, or a second manual operation based on a pulse signal from a manual pulse generator by operating a control panel.

In the technique described in literature 2, it is necessary to perform a delicate operation of lightly pressing the switch.

In the technique described in literature 3, control is performed to detect extraction of a remote operation panel from a designated storage position and enable the remote operation panel. In this control method, however, to operate an operation device that is provided not on the remote operation panel but on the main operation panel during the remote operation, it is necessary to store the remote operation panel in a predetermined location and operate it.

In the apparatuses described in literatures 1 to 3, if an incorrect operation is done on the main operation panel, the operation from the remote operation apparatus may be impossible, or the machine tool may stop. Such specifications are not user friendly.

The present invention enables to provide a technique of solving the above-described problem.

Solution to Problem

One aspect of the present invention provides a machine apparatus comprising:
a machine driver that is mechanically driven;
a main operation unit that operates the machine driver;
a remote operation unit that transmits an operation instruction signal to the machine driver at a position apart from the main operation unit;
a position determiner that determines a position of the remote operation unit; and
a controller that, upon determining that the remote operation unit is located in a predetermined area, enables operations by the main operation unit, and upon determining that the remote operation unit is located outside the predetermined area, disables at least some operations by the main operation unit.

Another aspect of the present invention provides a remote operation apparatus that transmits an operation instruction signal to a machine driver at a position apart from a main operation unit that operates the machine driver, comprising:
a position determiner that determines a position of the remote operation apparatus; and
a controller that, upon determining that the remote operation apparatus is located in a predetermined area, enables operations by the main operation unit, and upon determining that the remote operation unit is located outside the predetermined area, disables at least some operations on the main operation unit.

Still other aspect of the present invention provides a main operation apparatus that operates a machine driver, comprising:
a position determiner that determines a position of a remote operation apparatus that operates the machine driver at a position apart from the main operation apparatus; and a controller that, upon determining that the remote operation apparatus is located in a predetermined area, enables operations on the main operation apparatus, and upon determining that the remote operation apparatus is located outside the predetermined area, disables at least some operations on the main operation apparatus.

Still other aspect of the present invention provides a method of controlling a machine apparatus including:

a machine driver that is mechanically driven;

a main operation unit that operates the machine driver; and a remote operation unit that transmits an operation instruction signal to the machine driver at a position apart from the main operation unit, the method comprising:

determining a position of the remote operation unit;

enabling operations by the main operation unit upon determining that the remote operation unit is located in a predetermined area; and disabling at least some operations by the main operation unit upon determining that the remote operation unit is located outside the predetermined area.

Advantageous Effects of Invention

According to the present invention, it is possible to provide a machine apparatus including a remote operation unit that a user can more easily operate.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
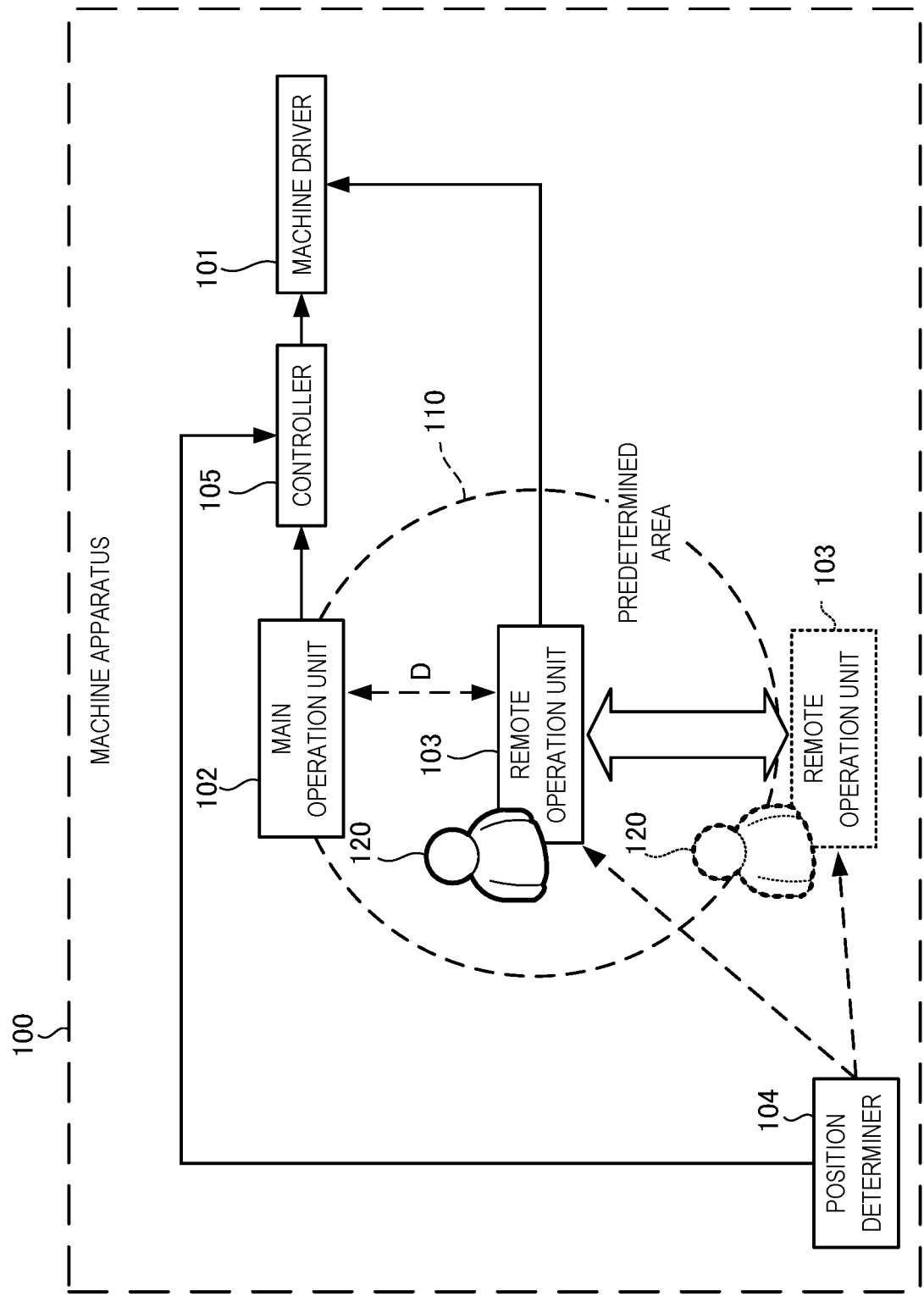
FIG. 1 is a block diagram showing the arrangement of a machine apparatus according to the first embodiment of the present invention.

A machine apparatus 100 will be described as the first embodiment of a machine apparatus according to the present invention. FIG. 1 is a block diagram showing the functional arrangement of the machine apparatus 100. The machine apparatus 100 includes a machine driver 101, a main operation unit 102, a remote operation unit 103, a position determiner 104, and a controller 105.

The machine driver 101 is a component that is mechanically driven. In this embodiment, for example, a main spindle, a feed axis, and the like are driven to perform machining. That is, the machine apparatus 100 functions as a machine tool.

The main operation unit 102 is a so-called main panel and is used by an operator 120 to operate the machine driver 101.

At a position apart from the main operation unit 102, the remote operation unit 103 transmits an operation instruction signal to the machine driver 101 to operate the machine driver 101. The remote operation unit 103 is, for example, a separate manual pulse handle box used when the distance from the main operation unit 102 to the machine driver 101 is long. The operator 120 can move with the remote operation unit 103 in hand. The machine driver 101 is normally provided in a housing. In case of a large machine tool, when taking a close look at the machine driver, the operator cannot operate the main panel serving as the main operation unit 102. To allow the operator to do operations while taking a close look at the machine driver 101, the remote operation unit 103 is provided. For example, each of the main operation unit 102 and the remote operation unit 103 includes a pulse handle configured to transmit drive pulses corresponding to a rotation amount to the machine driver 101. For example, 100 pulses are transmitted to the machine driver 101 by one rotation of the pulse handle. The machine driver 101 generates a moving instruction of, for example, 1 to 10 μm per pulse sent from the main operation unit 102 or the remote operation unit 103. During an unused time, the remote operation unit 103 is mounted on the mount portion (not shown) of the main operation unit 102. The main operation unit 102 and the remote operation unit 103 are connected via a cable.

The position determiner 104 determines the position of the remote operation unit 103. Upon determining that the remote operation unit 103 is located in a predetermined area 110, the controller 105 enables operations of the machine driver 101 by the main operation unit 102. Upon determining that the operator 120 removes the remote operation unit 103 from the predetermined area 110, the controller 105 disables at least some operations of the machine driver 101 by the main operation unit 102. The controller 105 determines, based on a distance D between the main operation unit 102 and the remote operation unit 103, whether the remote operation unit 103 is located in the predetermined area 110 or outside the predetermined area 110. For example, upon determining that the remote operation unit 103 is located at a position apart from the main operation unit 102, the controller 105 disables an operation on the pulse handle of the main operation unit 102.

Figure 2:
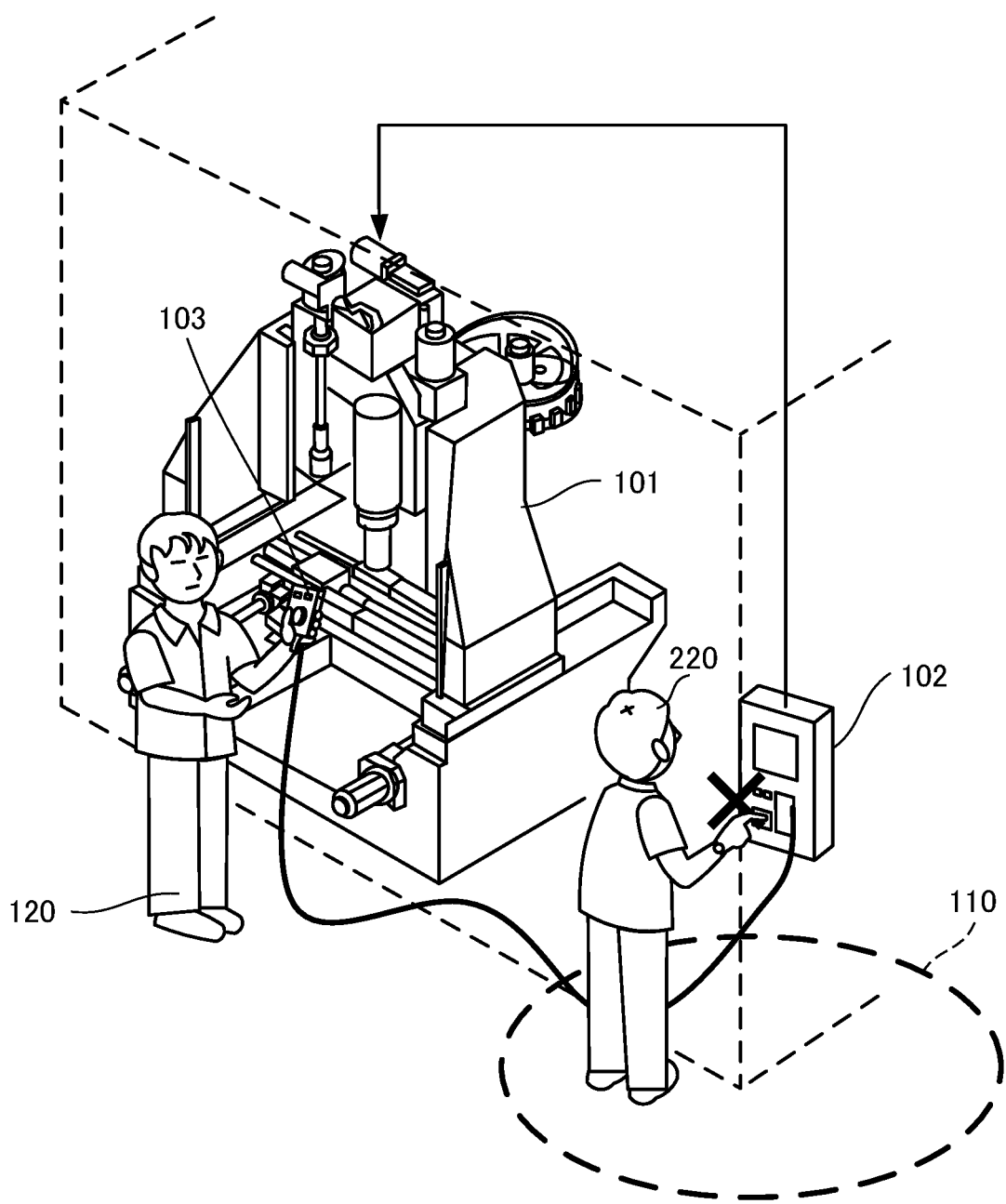
FIG. 2 is a view for explaining the operation of the machine apparatus according to the first embodiment of the present invention.

More specifically, as shown in FIG. 2, when the operator 120 is operating the machine driver 101 by the pulse handle of the remote operation unit 103 near a machining center as an example of the machine driver 101, some functions of the main panel serving as the main operation unit 102 are disabled. This can prevent a risk of injury to the operator 120 caused by the machine driver 101 abruptly moved by an operation of another operator 220 on the main operation unit 102.

Figure 3:
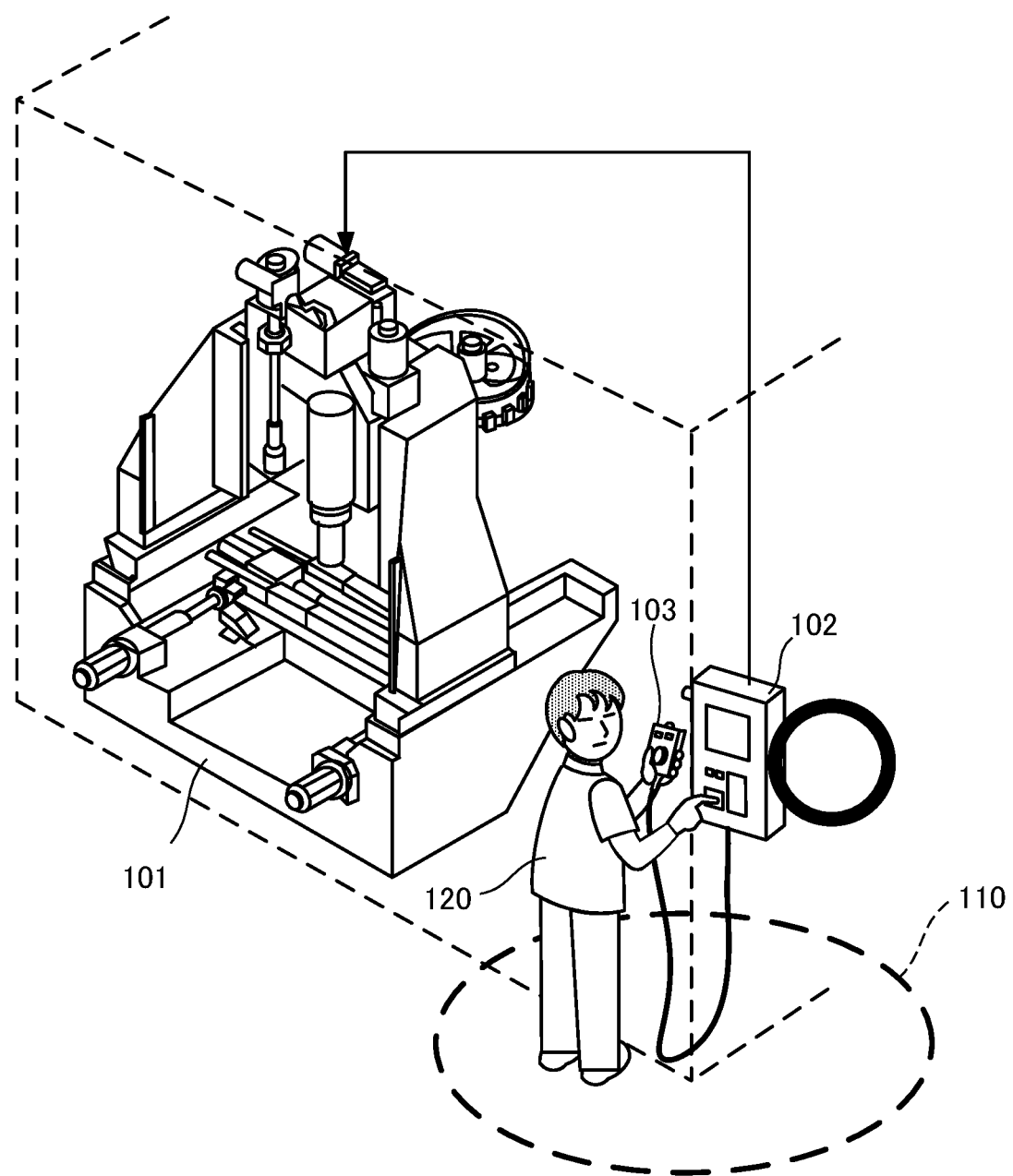
FIG. 3 is a view for explaining the operation of the machine apparatus according to the first embodiment of the present invention.

On the other hand, as shown in FIG. 3, in a state in which the remote operation unit 103 is located in the predetermined area 110, and it can be determined that the operator 120 exists near the main operation unit 102, it is determined that there is no risk to the operator 120 caused by the machine driver 101. Hence, the operation of the machine driver 101 using the main operation unit 102 is enabled.

According to the above-described arrangement, an operation of switching between the main operation unit and the remote operation unit is unnecessary, and automatic switching is performed to enable an operation panel that the operator is going to operate. It is therefore possible to provide a user-friendly machine apparatus.

Particularly in a large machine tool, when switching between a main operation panel used for a normal operation and a separate manual handle box used in a case in which the distance from the main operation panel to the processing area is long, no changeover switch is needed, and the switching can be performed automatically and safely.

Second Embodiment

Figure 4:
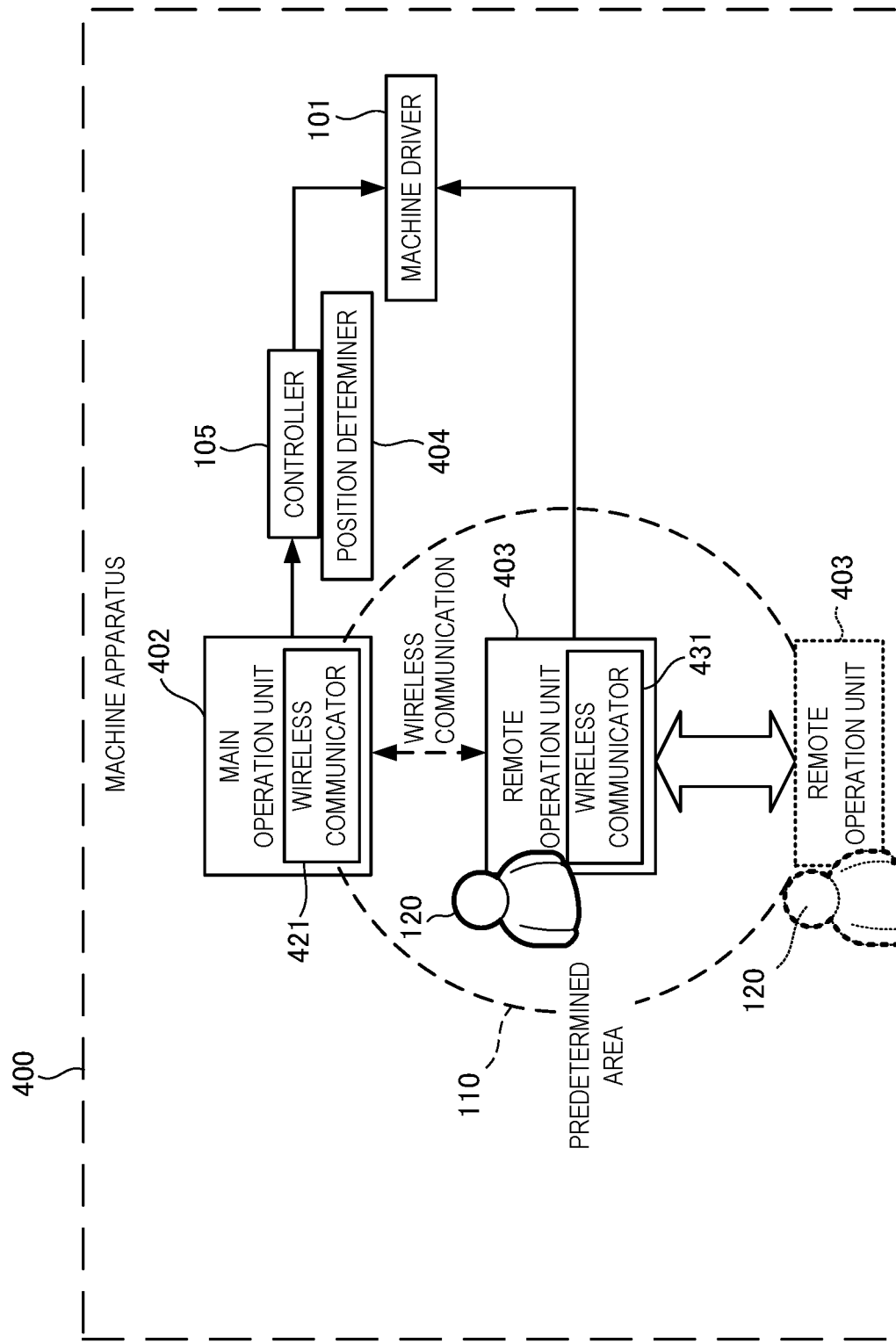
FIG. 4 is a block diagram showing the arrangement of a machine apparatus according to the second embodiment of the present invention.

A machine apparatus according to the second embodiment of the present invention will be described next with reference to FIG. 4. FIG. 4 is a block diagram for explaining the functional arrangement of a machine apparatus 400 according to this embodiment. As compared to the first embodiment, in the machine apparatus 400 according to this embodiment, a main operation unit 402 and a remote operation unit 403 include wireless communicators 421 and 431, respectively, and a position determiner 404 determines a position based on a state of wireless communication. The rest of the components and operations is the same as in the first embodiment. Hence, the same reference numerals denote the same components and operations, and a detailed description thereof will be omitted.

The position determiner 404 determines, based on the state of wireless communication between the main operation unit 402 and the remote operation unit 403, whether the remote operation unit 403 is located in a predetermined area 110. The wireless communication is not limited to communication using a radio wave, and optical wireless communication such as infrared communication may be used. Upon determining that the remote operation unit 403 is located in the predetermined area 110 (at a position close to the main operation unit 402), a controller 105 enables operations on the main operation unit 402. On the other hand, upon determining that the remote operation unit 403 is located outside the predetermined area 110, the controller 105 disables at least some operations (for example, an operation on a pulse handle) on the main operation unit 402. Even if a failure occurs in a control circuit associated with a radio signal, and a response to a radio signal stops, the controller 105 disables operations on the main operation unit 402.

According to the above-described arrangement, an operation of switching between the main operation unit and the remote operation unit is unnecessary, and an operation panel that the operator is going to operate is enabled. In this embodiment, even if a failure occurs in a control circuit associated with a radio signal, operations on the main operation unit are disabled. When an operator with the remote operation unit exists near the machine driver, another operator cannot erroneously operate the machine driver from the main operation unit, and safety is ensured.

Third Embodiment

Figure 5:
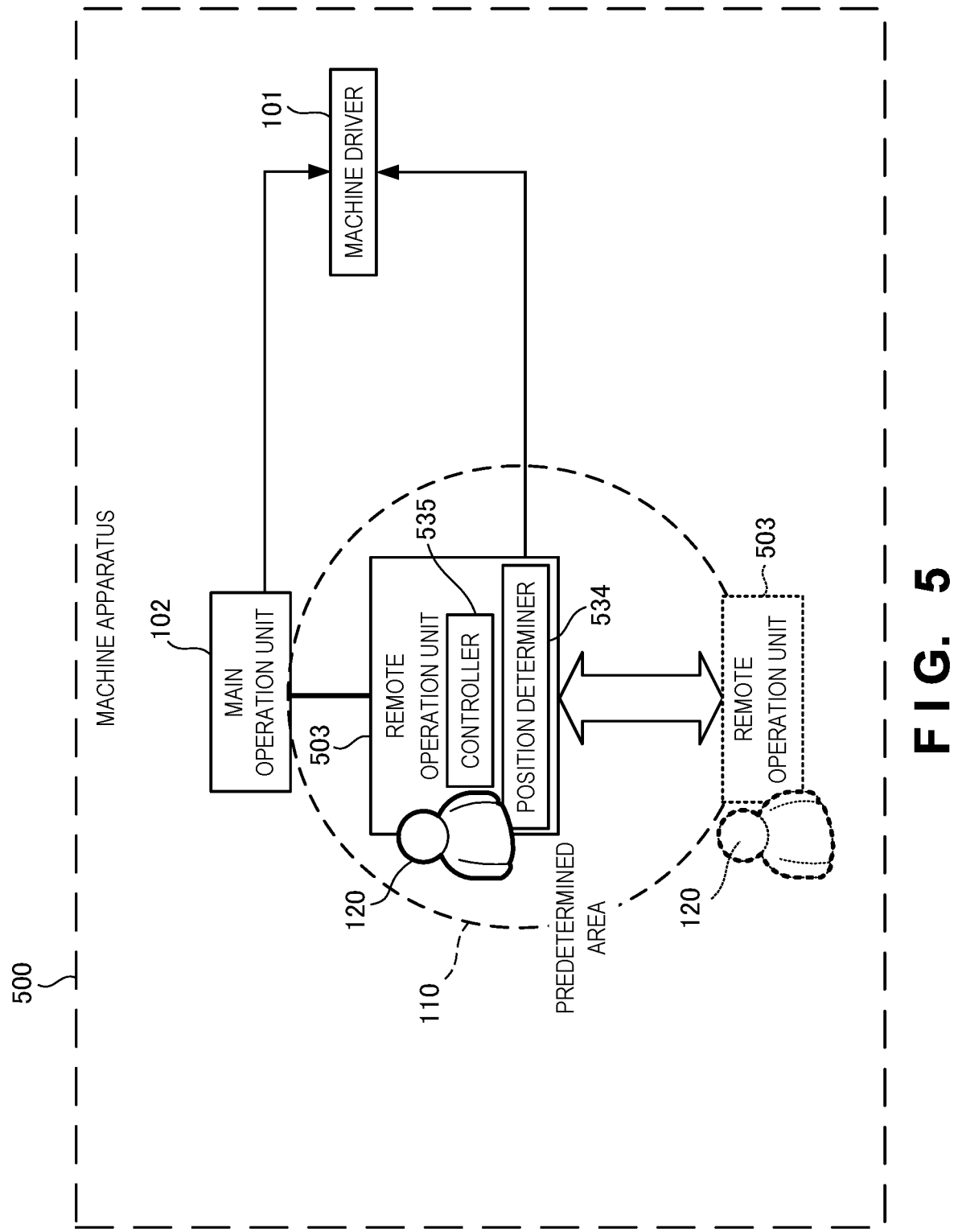
FIG. 5 is a block diagram showing the arrangement of a machine apparatus according to the third embodiment of the present invention.

A machine apparatus according to the third embodiment of the present invention will be described next with reference to FIG. 5. FIG. 5 is a block diagram for explaining the functional arrangement of a machine apparatus 500 according to this embodiment. The machine apparatus 500 is different from the first embodiment in that a remote operation unit 503 includes a position determiner 534 and a controller 535. The position determiner 534 determines the distance from a machine driver 101 based on, for example, whether a signal from a signal transmitter (not shown) provided in the machine driver 101 is received. If the distance from the machine driver 101 is a predetermined value or less, the controller 535 sends a command to a main operation unit 102 not to transmit a predetermined control signal to the machine driver 101. For example, the controller 535 controls not to transmit a pulse signal to the machine driver 101 even if the pulse handle of the main operation unit 102 is operated. Alternatively, the controller 535 sends a command to the machine driver 101 to disable a pulse from the main operation unit 102.

According to the above-described arrangement, it is possible to switch enable/disable of at least some operations on the main operation unit 102 in accordance with the distance between the machine driver 101 and the remote operation unit 503.

Fourth Embodiment

Figure 6:
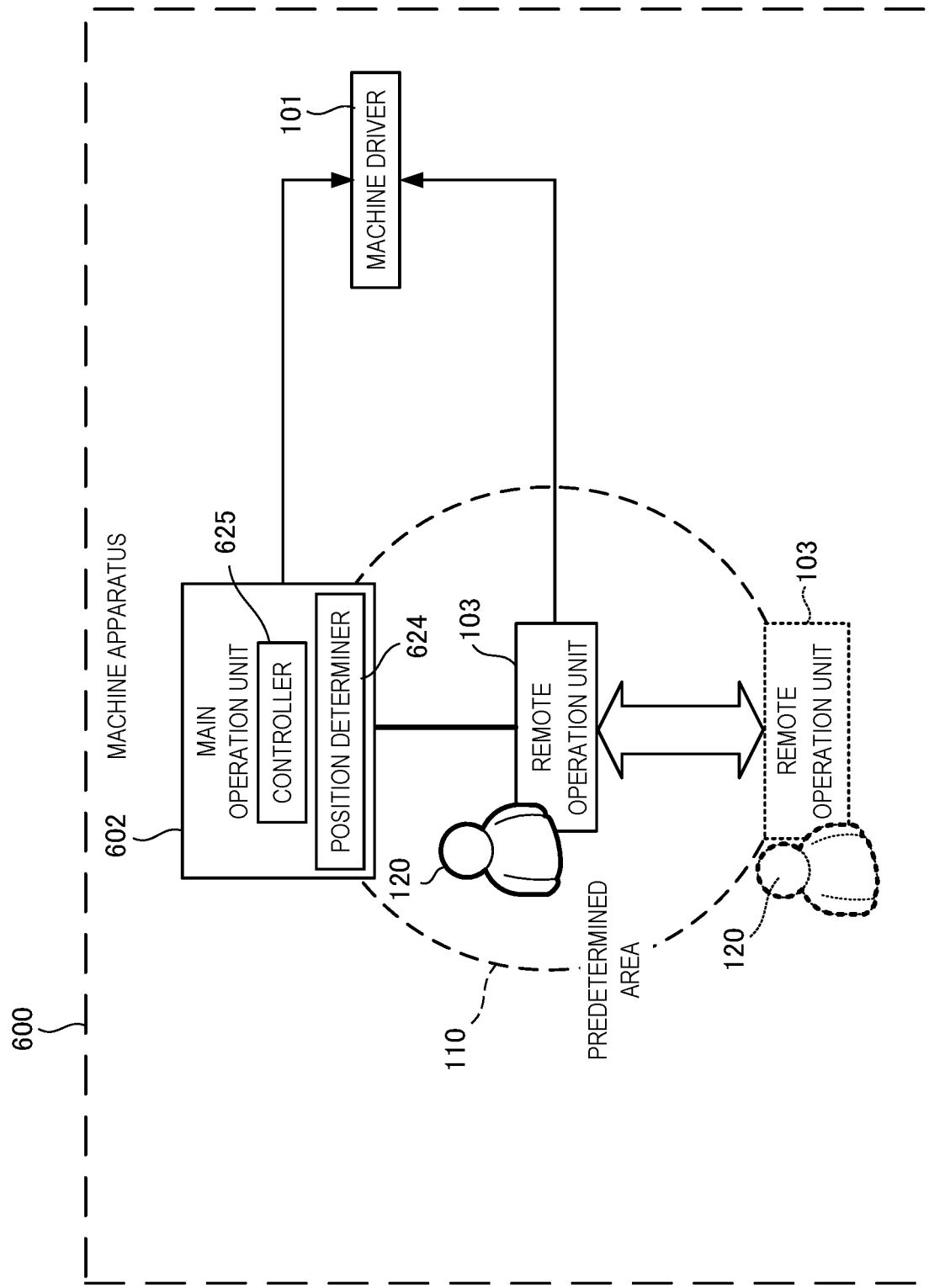
FIG. 6 is a block diagram showing the arrangement of a machine apparatus according to the fourth embodiment of the present invention.

A machine apparatus according to the fourth embodiment of the present invention will be described next with reference to FIG. 6. FIG. 6 is a block diagram for explaining the functional arrangement of a machine apparatus 600 according to this embodiment. The machine apparatus 600 is different from the first embodiment in that a main operation unit 602 includes a position determiner 624 and a controller 625. For example, upon detecting, based on the selection state of an operation switch or the like, that an operator is going to perform an operation concerning the pulse handle of the main operation unit 602, the position determiner 624 transmits a weak radio signal to search for the position of a remote operation unit 103. If a response to the weak radio signal is not returned, the controller 625 determines that the remote operation unit 103 does not exist in the vicinity and disables user operations. On the other hand, if the remote operation unit 103 returns a response signal to the weak radio signal wirelessly or via a cable, the controller 625 determines that the remote operation unit 103 exists in the vicinity and enables user operations.

According to the above-described arrangement, it is possible to switch enable/disable of at least some operations on the main operation unit 602 in accordance with the distance between the main operation unit 602 and the remote operation unit 103.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus.

This application claims the benefit of Japanese Patent Application No. 2014-142767 filed on Jul. 10, 2014, which is hereby incorporated by reference herein in its entirety.

The invention claimed is:

1. A machine apparatus comprising:
a mechanical unit that is mechanically driven;
a main operation panel used by an operator to provide one or more operation instruction signals to said mechanical unit;
a remote operation panel that transmits one or more operation instruction signals to said mechanical unit at a position apart from said main operation panel;
a position determiner that determines a distance D between said remote operation panel and said main operation panel; and
a controller that, upon determining that said distance D is within a predetermined distance, enables accepting said one or more operation instruction signals from said main operation panel, and upon determining that said distance D is not within the predetermined distance, disables accepting at least some of said one or more operation instruction signals from said main operation panel.

2. The machine apparatus according to claim 1, wherein said position determiner determines, based on a state of wireless communication between said main operation panel and said remote operation panel, whether said distance D is within the predetermined distance.

3. The machine apparatus according to claim 1, wherein said position determiner determines, based on a state of infrared communication between said main operation panel and said remote operation panel, whether said distance D is within the predetermined distance.

4. The machine apparatus according to claim 1, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

5. A remote operation apparatus that transmits an operation instruction signal to a mechanical unit at a position apart from a main operation panel that provides one or more operation instruction signals to said mechanical unit, comprising:
a position determiner that determines a distance D between said remote operation panel and said main operation panel; and
a controller that, upon determining that said distance D is within a predetermined distance, enables accepting said one or more operation instruction signals from said main operation panel, and upon determining that said distance D is not within the predetermined distance, disables accepting at least some of said one or more operation instruction signals from said main operation panel.

6. A main operation apparatus that operates a mechanical unit, comprising:
a position determiner that determines a distance D between the main operation apparatus and a remote operation apparatus that operates said mechanical unit at a position apart from the main operation apparatus; and
a controller that, upon determining that said distance D is within a predetermined distance, enables accepting one or more operation instruction signals from the main operation apparatus, and upon determining that said distance D is not within the predetermined distance, disables accepting at least some of said one or more operation instruction signals from the main operation apparatus.

7. A method of controlling a machine apparatus including:
a mechanical unit that is mechanically driven;
a main operation panel used by an operator to provide one or more operation instruction signals to the mechanical unit; and
a remote operation panel that transmits one or more operation instruction signals to the mechanical unit at a position apart from the main operation panel,
the method comprising:
determining a distance D between the main operation panel and the remote operation panel;
accepting the one or more operation instruction signals from the main operation panel upon determining that the distance D is within a predetermined distance; and
blocking at least some of the one or more operation instruction signals from the main operation panel upon determining that the distance D is not within the predetermined distance.

8. The machine apparatus according to claim 1, wherein said position determiner determines, based on a state of wireless communication between said main operation panel and said remote operation panel, whether said remote operation panel is located within the predetermined distance from said main operation panel.

9. The machine apparatus according to claim 1, wherein said position determiner determines, based on a state of infrared communication between said main operation panel and said remote operation panel, whether said remote operation panel is located within the predetermined distance from said main operation panel.

10. The machine apparatus according to claim 2, wherein said position determiner determines, based on a state of infrared communication between said main operation panel and said remote operation panel, whether said remote operation panel is located within the predetermined distance from said main operation panel.

11. The machine apparatus according to claim 8, wherein said position determiner determines, based on a state of infrared communication between said main operation panel and said remote operation panel, whether said remote operation panel is located within the predetermined distance from said main operation panel.

12. The machine apparatus according to claim 1, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

13. The machine apparatus according to claim 2, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

14. The machine apparatus according to claim 8, wherein each of said main operation panel and said remote operation panel includes a handle that transmits drive pulses corresponding to a rotation amount to said mechanical unit, and upon determining that said remote operation panel is located at a position apart from said main operation panel, an operation on said handle of said main operation panel is disabled.

15. The machine apparatus according to claim 3, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

16. The machine apparatus according to claim 9, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

17. The machine apparatus according to claim 10, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

18. The machine apparatus according to claim 11, wherein each of said main operation panel and said remote operation panel includes a handle that transmits drive pulses corresponding to a rotation amount to said mechanical unit, and
upon determining that said remote operation panel is located at a position apart from said main operation panel, an operation on said handle of said main operation panel is disabled.

* * * * *